United States Patent [19]

Adachi

[11] Patent Number: 5,493,388
[45] Date of Patent: Feb. 20, 1996

[54] DISTANCE MEASURING DEVICE

[75] Inventor: Tadashi Adachi, Sayama, Japan

[73] Assignee: Nissan Motor Co., Ltd., Yokohama, Japan

[21] Appl. No.: 289,037

[22] Filed: Aug. 11, 1994

[30] Foreign Application Priority Data

Sep. 2, 1993 [JP] Japan ..................... 5-218853

[51] Int. Cl.$^6$ ................................................. G01C 3/08
[52] U.S. Cl. ........................................ 356/5.01; 359/216
[58] Field of Search ............................... 356/5.01, 5.02; 359/198, 216, 217; 250/334, 347

[56] References Cited

U.S. PATENT DOCUMENTS

| | | | |
|---|---|---|---|
| 4,017,146 | 4/1977 | Lichtman | 356/4 |
| 4,733,072 | 3/1988 | Lettington | 356/5 |
| 5,006,721 | 4/1991 | Cameron et al. | 356/5 |
| 5,200,606 | 4/1993 | Krasutsky et al. | 250/234 |
| 5,289,001 | 2/1994 | Arimoto et al. | 250/236 |

OTHER PUBLICATIONS

"Three-Dimensional Imaging and Applications", Research Paper, Max Bair et al., Environmental Research Institute of Michigan.

*Primary Examiner*—Mark Hellner
*Attorney, Agent, or Firm*—Lowe, Price, LeBlanc & Becker

[57] ABSTRACT

A distance measuring device of laser beam using type has a laser diode for producing laser beams. A scanning mechanism projects the laser beams against an object and includes a polygon mirror to and by which the laser beams are directed and reflected. A receiver mechanism receives the laser beams reflected by the object. A control unit measures the period required for the laser beams to make the trip around the object. The polygon mirror is so arranged as to be rotated about a first axis and swung about a second axis.

14 Claims, 3 Drawing Sheets

DISTANCE MEASURING DEVICE

BACKGROUND OF THE INVENTION

1. Field of the Invention

The present invention relates in general to devices for measuring a distance and more particularly, to distance measuring devices of laser beam using type which, for measuring the distance between it and an object, transmits laser beam toward the object and detects the laser beam reflected by the object. In fact, the period required for the laser beam to make the round trip is detected. Distance to the object is equal to the one-half of the time elapsed multiplied by the velocity of the laser beam.

2. Description of the Prior Art

In order to clarify the task of the present invention, one conventional distance measuring device of the above-mentioned type will be described with reference to FIG. 5 of the accompanying drawings.

The conventional distance measuring device 100 shown in FIG. 5 comprises generally a transmitter optical section, a scanning optical section and a receiver optical section.

As shown, the transmitter optical section comprises a laser diode 102, a collimating lens 104, anamorphic prism pair 106 and a beam expansion telescope 108. The highly divergent elliptical output beam from the diode 102 is collimated by the collimating lens 104. The beam is then made circular by the anamorphic prism pair 106 and expanded in the beam expansion telescope 108 to create an output beam that increases in diameter.

The scanning optical section comprises a four-sided polygon mirror 110 and a nodding mirror 112 which together scan a raster from left to right, top to bottom. The polygon mirror 110 rotates about its axis 110a at a given speed, and the nodding mirror 112 swings about its axis 112a synchronously with the polygon mirror 110. Denoted by numeral 114 is a motor for swinging the nodding mirror 112. That is, receiving the transmitter laser beam "Lt" from the beam expansion telescope 108, the polygon mirror produces a number of scan lines per second. These scan lines are framed by the nodding mirror 112. Due to the synchronous motion of the polygon mirror 110 and the nodding mirror 112, the transmitter laser beam "Lt" projected from the nodding mirror 110 scans an object (not shown) from left to right, top to bottom or vice versa.

The receiver optical section comprises generally folding and alignment mirrors 116, a narrowband optical filter 118, a reduction telescope 120 and a laser beam receiver 122 (viz., avalanche photodiode). Due to the synchronous motions of the nodding mirror 112 and the polygon mirror 110, the receiver laser beam "Lr" reflected by the object is directed toward to an inlet part of the folding and alignment mirrors 116 and led to the laser beam receiver 122 through the narrowband optical filter 118 and the reduction telescope 120. Although not shown in the drawing, a control unit is employed which has means for detecting the period required for the laser beam to make the round trip.

However, due to its inherent construction, the above-mentioned conventional device 100 has a weak point in obtaining a sufficiently strong receiver laser beam "Lr". Furthermore, usage of the nodding mirror 112 causes a bulky and heavy construction of the device 100.

SUMMARY OF THE INVENTION

It is therefore an object of the present invention to provide a distance measuring device of laser beam using type, which is free of the above-mentioned drawbacks.

In the distance measuring device of the present invention, there are employed two optical tracks for leading she receiver laser beam "Lr" to the laser beam receiver (viz., the avalanche photodiode).

In the distance measuring device of the present invention, there are employed fixed mirrors in place of the above-mentioned nodding mirror.

According to the present invention, there is provided a distance measuring device of laser beam using type, which comprises first means for producing laser beams; second means for projecting the laser beams against an object, the second means including a polygon mirror to and by which the laser beams are directed and reflected; third means for receiving the laser beams reflected by the object; and fourth means for measuring the period required for the laser beams to make the trip around the object, wherein the polygon mirror is so arranged as to be rotated about a first axis thereof and swung about a second axis thereof.

DETAILED DESCRIPTION OF THE EMBODIMENTS

Figure 1:
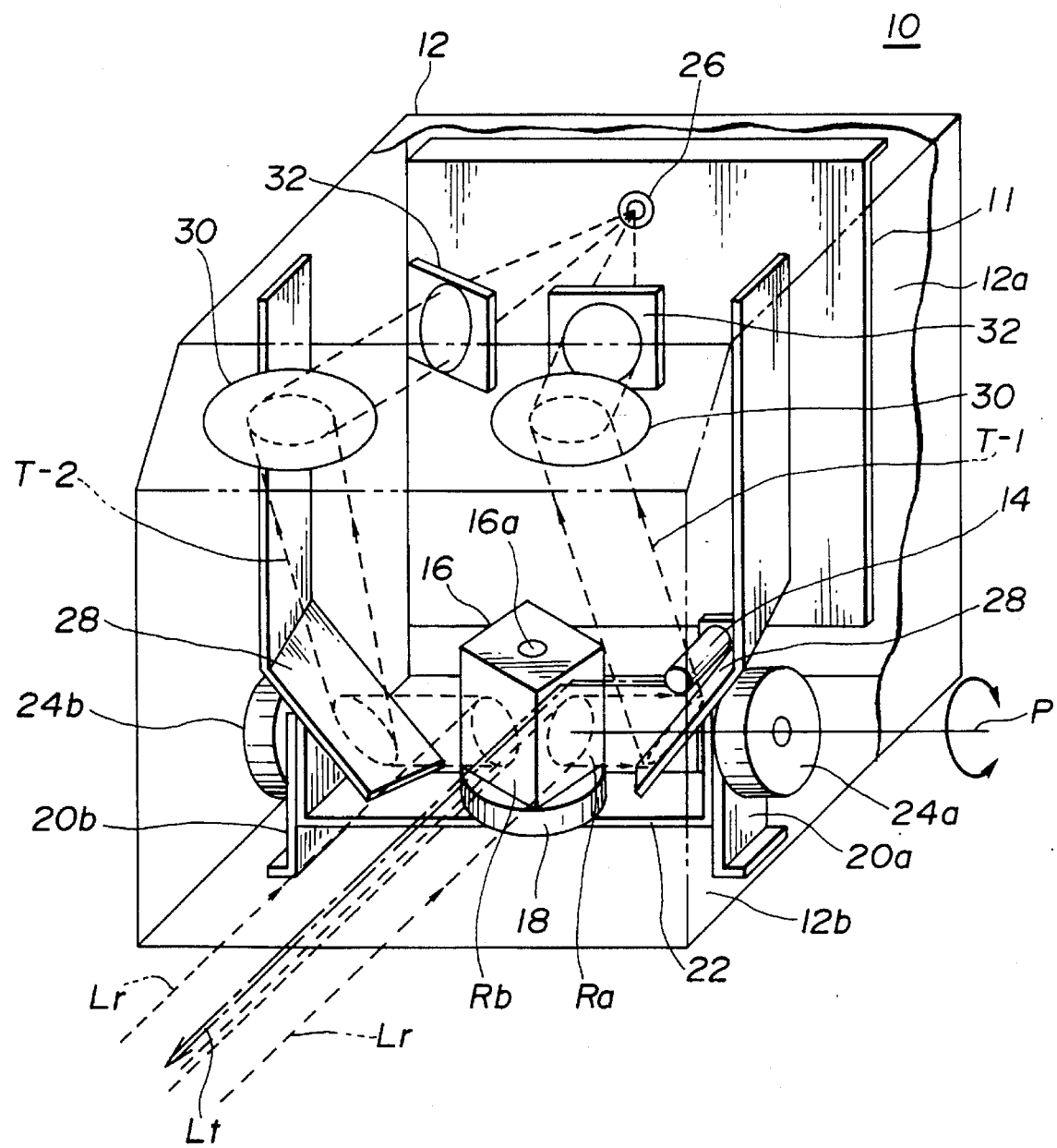
FIG. 1 is a perspective view of a distance measuring device, which is a first embodiment of the present invention.

Referring to FIG. 1 of the drawings, there is shown a distance measuring device 10 of laser beam using type which is a first embodiment of the present invention.

The device 10 comprises generally a transmitter optical section, a scanning optical section, a receiver optical section and a control circuit 11 which are housed in a case 12. The case 12 comprises a rear wall 12a and a bottom wall 12b. The control circuit 11 is printed on a board fixed to the rear wall 12a.

Figure 5:
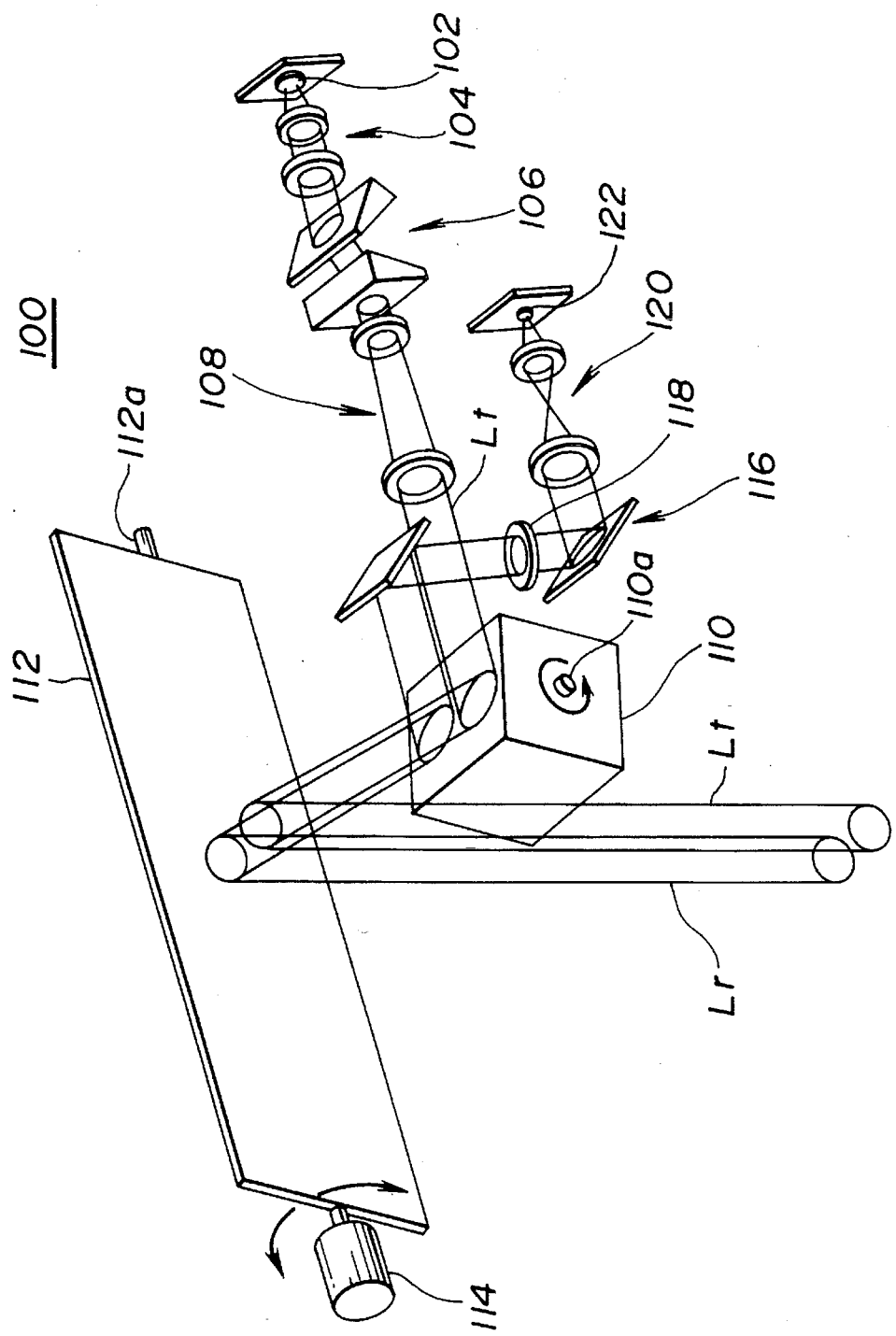
FIG. 5 is a schematic perspective view of a conventional distance measuring device.

The transmitter optical section comprises generally a laser diode, a collimating lens, anamorphic prism pair and a beam expansion telescope which are arranged in a manner similar to that of FIG. 5 and installed in a cylinder 14. A larger diameter laser beam is thus emitted from the cylinder 14 toward the scanning optical section.

Figure 2:
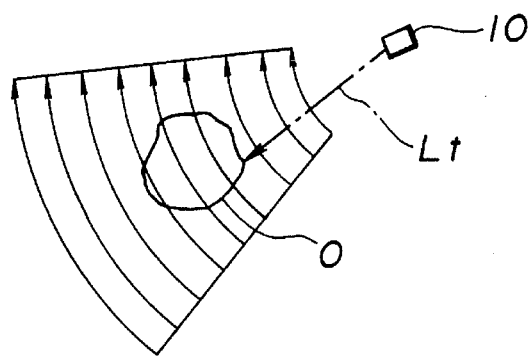
FIG. 2 is a view showing a scanning pattern of laser beams provided by the device of the first embodiment.

The scanning optical section comprises a four-sided polygon mirror 16 which is mounted on an electric motor 18 to be rotated at a given speed about its axis 16a. A nodding mechanism is incorporated with the motor 18 to swing the polygon mirror 16 in a vertical direction in the drawing (FIG. 1). The nodding mechanism comprises a pair of stands 20a and 20b secured to the bottom wall 12b of the case 12. A nodding plate 22 on which the motor 18 is mounted is pivotally connected at its raised side walls to the stands 20a and 20b. A pivot axis "P" of the nodding plate 22 passes through a center of the polygon mirror 16 and is perpendicular to the rotation axis 16a of the polygon mirror 16. A step motor 24a is mounted to the stand 20a to stepwise pivot the nodding plate 22 at given speed and interval. An angle sensor 24b is mounted to the other stand 20b for sensing the angle of the nodding plate 22 relative to the fixed bottom wall 12b of the case 12. That is, when, due to continuous stepwise motion of the step motor 24a, the nodding plate 22 comes to its lowermost position, the angle sensor 24b issues a signal to operate the step motor 24a in a manner to jump up the nodding plate 22 to its uppermost position. The rotation of the polygon mirror 16 and the swinging movement of the swing plate 22 are synchronized so that the transmitter laser beam "Lt" reflected by the polygon mirror 16 scans an object "O" (see FIG. 2) from left to right, top to bottom.

The receiver optical section comprises generally two optical tracks "T-1" and "T-2" (or optical guide ways) through which the receiver laser beams "Lr" reflected by the object "O" pass to be focused on a common laser beam receiver 26 (viz., avalanche photodiode). As shown in the drawing (FIG. 1), the two tracks "T-1" and "T-2" are arranged symmetrical with respect to an imaginary plane along which the rotation axis 16a of the polygon mirror 16 travels during the swinging movement of the nodding plate 22. Each track "T-1" or "T-2" comprises one "Ra" or "Rb" of four mirror surfaces of the polygon mirror 16, a first inclined fixed mirror 28 arranged beside the polygon mirror 16, a second inclined fixed mirror 30 arranged above the first mirror 28 and a reduction telescope 32 arranged between the second mirror 30 and the beam receiver 26. The reduction telescope 32 is equipped with an interference filter.

During rotation and swinging motion of the polygon mirror 16, the receiver laser beams "Lr" reflected by the object "O" are directed to and reflected by the neighboring two "Ra" and "Rb" of the four mirror surfaces of the polygon mirror 16. The laser beams "Lr" thus reflected by the polygon mirror 16 are led to the laser beam receiver 26 through respective optical tracks "T-1" and "T-2" as will be understood from FIG. 1.

The control circuit 11 detects the period required for the laser beam ("Lt" +"Lr") to make the trip around the object "O".

As will be seen from the above description, in the first embodiment, there are employed two optical tracks for leading the receiver laser beams "Lr" to the laser beam receiver 26. This means that the laser beam receiver 26 can receive a sufficiently strong receiver laser beam "Lr". Furthermore, in the embodiment, there is not employed a so-called "nodding mirror". Thus, a compact and light weight construction of the device 10 is achieved.

Figure 3:
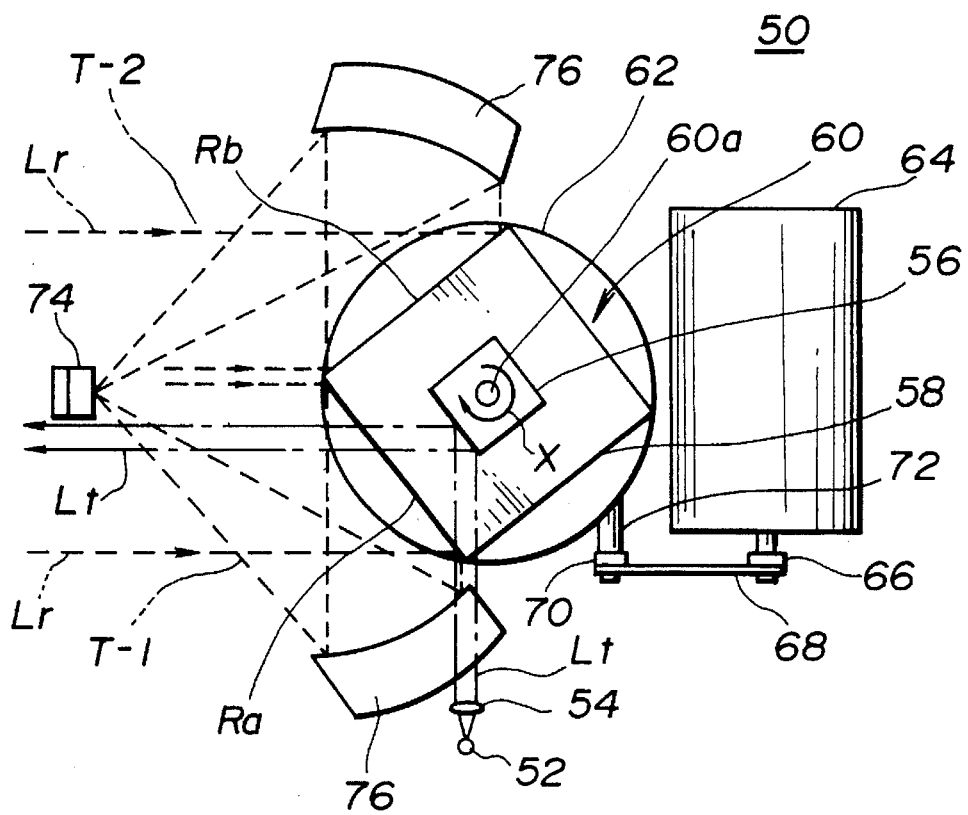
FIG. 3 is a plan view of a distance measuring device, which is a second embodiment of the present invention.
Figure 4:
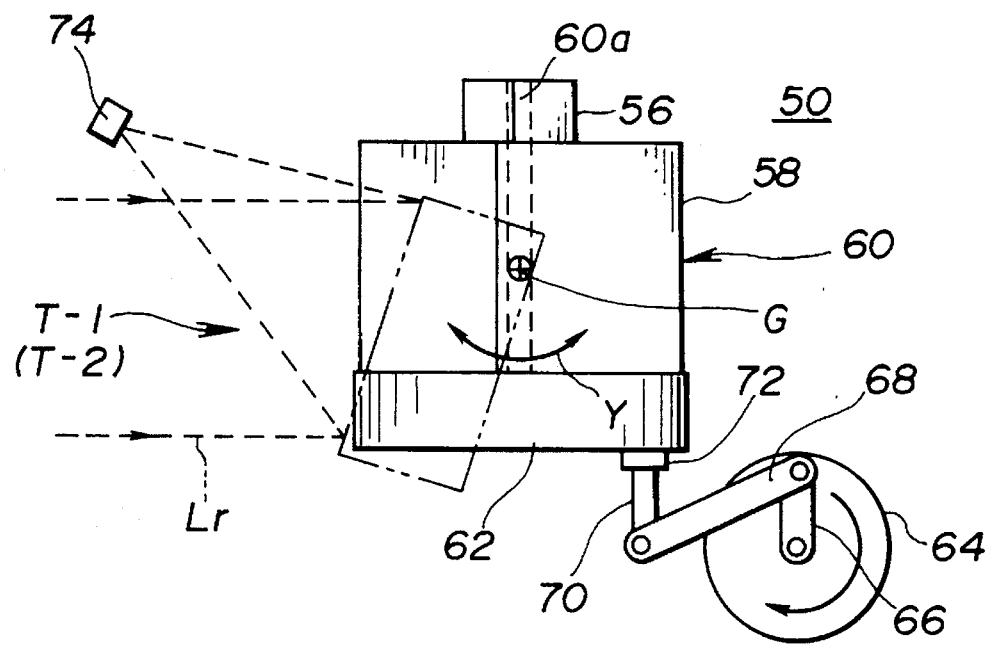
FIG. 4 is a side view of the distance measuring device of the second embodiment.

Referring to FIGS. 3 and 4, there is shown a distance measuring device 50 of laser beam using type which is a second embodiment of the present invention. In this second embodiment, an integral unit including two, viz., smaller and larger polygon mirrors is employed, as will be clarified hereinafter.

The distance measuring device 50 comprises generally a transmitter optical section, a scanning optical section, a receiver optical section and a control circuit which are housed in a case (not shown).

The transmitter optical section comprises generally a laser diode 52 and a collimating lens 54. The laser beam produced by the laser diode 52 is collimated by the collimating lens 54 to create parallel laser beam "Lt" that is directed toward the scanning optical section, that is, toward a first four-sided polygon mirror 56 which will be described in the following.

The scanning optical section comprises the first four-sided polygon mirror 56 which is integrally mounted on a second four-sided polygon mirror 58 to constitute a polygon mirror unit 60. The four mirror surfaces of the second polygon mirror 58 are larger than those of the first polygon mirror 56. The polygon mirror unit 60 is mounted on an electric motor 62 to be rotated at a given speed about its axis 60a.

A nodding mechanism is incorporated with the motor 62 to swing the polygon mirror unit 60 in the direction of the arrow "Y" (see FIG. 4) about a horizontal axis "G" which passes through a center of the polygon mirror unit 60. The axis "G" is perpendicular to the above-mentioned rotation axis 60a of the polygon mirror unit 60. The nodding mechanism comprises a step motor 64, a first lever 66 connected at its inside end to an output shaft of the motor 64, a second lever 68 pivotally connected at one end to the first lever 66, and a third lever 70 pivotally connected at one end to the other end of the second lever 68. The other end of the third lever 70 is secured to an extension base part 72 of the motor 62. Thus, when the step motor 64 is energized, the polygon mirror unit 60 is stepwisely pivoted about the axis "G". The rotation of the polygon mirror unit 60 and the swinging movement of the motor 62 are synchronized so that the transmitter laser beam "Lt" reflected by the first polygon mirror 56 scans an object from left to right, top to bottom.

The receiver optical section comprises generally two optical tracks "T-1" and "T-2" through which the receiver laser beams "Lr" reflected by the object pass to be focused on a common laser beam receiver 74 (viz., avalanche photodiode). As shown in FIG. 3, the two tracks "T-1" and "T-2" are arranged symmetrical with respect to an imaginary plane along which the rotation axis 60a of the polygon mirror unit 60 travels during the swinging movement of the motor 62. Each track "T-1" or "T-2" comprises one "Ra" or "Rb" of the four mirror surfaces of the second polygon mirror 58, a concave fixed mirror 76 arranged beside the polygon mirror unit 60. The concave fixed mirror 76 has its focus at the laser beam receiver 74.

During rotation and swinging motion of the polygon mirror unit 60, the receiver laser beams "Lr" reflected by the object are directed to and reflected by the neighboring two "Ra" and "Rb" of the four mirror surfaces of the second polygon mirror 58. The laser beams "Lr" thus reflected by the second polygon mirror 58 are led to the laser beam receiver 74 through the respective concave mirrors 76.

As will be seen from the above description, also in the second embodiment, there are employed two optical tracks "T-1" and "T-2" for leading the receiving laser beams "Lr" to the laser beam receiver 74. Thus, the receiver 74 can receive a sufficiently strong receiver laser beam "Lr". Furthermore, in this second embodiment, there is not employed a nodding mirror. Thus, a compact and light weight construction is achieved by the device 50.

What is claimed is:

1. A distance measuring device of laser beam using type, comprising:

first means for producing laser beams;

second means for projecting said laser beams against an object, said second means including a polygon mirror to and by which said laser beams are directed and reflected;

third means for receiving the laser beams reflected by said object; and fourth means for measuring the period required for said laser beams to make the trip around the object, wherein said polygon mirror is so arranged as to be rotated about a first axis thereof and swung about a second axis thereof.

2. A distance measuring device as claimed in claim 1, in which said first axis is perpendicular to said second axis.

3. A distance measuring device as claimed in claim 2, in which said third means comprises:

a single laser beam receiver; and two optical tracks through which the laser beams reflected by said object are led to said laser beam receiver, said two optical tracks being arranged symmetrical with respect to an imaginary plane along which the first axis of said polygon mirror travels during the swinging movement of the polygon mirror.

4. A distance measuring device as claimed in claim 3, in which each of the two optical tracks comprises one of mirror surfaces of said polygon mirror and at least one fixed mirror.

5. A distance measuring device as claimed in claim 3, in which each of the two optical tracks comprises:

one of mirror surfaces of said polygon mirror;

a first inclined fixed mirror arranged beside the polygon mirror;

a second inclined fixed mirror arranged above said first inclined fixed mirror; and a reduction telescope arranged between said second inclined fixed mirror and said laser beam receiver.

6. A distance measuring device as claimed in claim 5, in which said reduction telescope is equipped with an interference filter.

7. A distance measuring device as claimed in claim 3, in which each of the two optical tracks comprises:

one of mirror surfaces of said polygon mirror; and a concave lens arranged beside said polygon mirror.

8. A distance measuring device as claimed in claim 7, in which said concave lens has its focus at the laser beam receiver.

9. A distance measuring device as claimed in claim 8, in which said polygon mirror includes:

a first polygon mirror part to and by which the laser beams from said first means are directed and reflected; and a second polygon mirror part to and by which the laser beams reflected by said object are directed and reflected, wherein mirror surfaces of said second polygon mirror part are larger than those of said first polygon mirror part.

10. A distance measuring device as claimed in claim 4, in which said second means further comprises:

an electric motor mounting thereon said polygon mirror to rotate the same in a given direction;

a nodding plate mounting thereon said electric motor, said nodding plate being pivotally mounted on a fixed structure; and a step motor for stepwisely pivot the nodding plate.

11. A distance measuring device as claimed in claim 10, in which said second means further comprises:

an angle sensor for sensing the angular position of said nodding plate relative to said fixed structure; and means for operating said step motor in a manner to jump up the nodding plate to its uppermost angular position when said angle sensor senses the lowermost angular position of said nodding plate.

12. A distance measuring device as claimed in claim 4, in which said second means further comprises:

an electric motor mounting thereon said polygon mirror to rotate the same in a given direction;

means for permitting a unit consisting of said electric motor and said polygon mirror to swing about said second axis;

a step motor; and a link mechanism for pivoting said unit about said second axis with an aid of said step motor.

13. A distance measuring device of laser beam using type, comprising:

means for producing laser beams;

a polygon mirror having mirror surfaces to and by which said laser beams are directed and reflected;

an electric motor on which said polygon mirror is mounted to be rotated about a first axis by the same;

a nodding plate on which said electric motor is mounted, said nodding plate being swung about a second axis which is perpendicular to said first axis;

a step motor for stepwisely swinging said nodding plate about said second axis;

a single laser beam receiver; and two optical tracks through which the laser beams reflected by said object are led to said laser beam receiver, said two optical tracks being arranged symmetrical with respect to an imaginary plate along which said first axis travels during swinging movement of said nodding plate about said second axis, each optical truck including one of mirror surfaces of said polygon mirror, a first inclined fixed mirror arranged beside the polygon mirror, a second inclined fixed mirror arranged above said first inclined fixed mirror and a reduction telescope arranged between said second inclined fixed mirror and said laser beam receiver.

14. A distance measuring device of laser beam using type, comprising:

means for producing laser beams;

a polygon mirror including a first polygon mirror part and a second polygon mirror part which are coaxially coupled, mirror surfaces of said second polygon mirror part being larger than those of said first polygon mirror part, said polygon mirror being so arranged that the laser beams are directed to and reflected by the mirror surfaces of said first polygon mirror part;

an electric motor on which said polygon mirror is mounted to be rotated about a first axis by the same;

means for permitting said electric motor to pivot about a second axis which is perpendicular to said first axis;

a step motor; and a link mechanism for pivoting said electric motor about said second axis with an aid of said step motor.

* * * * *